(12) United States Patent
Maria et al.

(10) Patent No.: US 7,409,201 B2
(45) Date of Patent: Aug. 5, 2008

(54) AUTOMATED PROVISIONING, MAINTENANCE, AND INFORMATION LOGGING OF CUSTOM ACCESS POINT NAMES IN PACKET-BASED MOBILE CELLULAR NETWORKS

(75) Inventors: Arturo Maria, Bellevue, WA (US);
Thomas James Jardine, Kent, WA (US); Robert C. Hopkins, Marysville, WA (US); Gary C. McAllister, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 19 days.

(21) Appl. No.: 11/201,480

(22) Filed: Aug. 11, 2005

(65) Prior Publication Data

US 2007/0036099 A1    Feb. 15, 2007

(51) Int. Cl.
*H04Q 7/20* (2006.01)

(52) U.S. Cl. .................. 455/403; 455/423; 455/424; 709/223; 709/224; 709/225; 709/226; 709/238; 370/338

(58) Field of Classification Search ............... 455/403, 455/423–424; 370/338; 709/223–226, 238, 709/242
See application file for complete search history.

(56) References Cited

U.S. PATENT DOCUMENTS

| | | | | |
|---|---|---|---|---|
| 6,801,781 B1* | 10/2004 | Provost et al. | ............... | 455/466 |
| 7,123,920 B1* | 10/2006 | Faccin et al. | ................ | 455/450 |
| 2002/0080757 A1* | 6/2002 | Narvanen et al. | ............ | 370/338 |
| 2003/0147363 A1* | 8/2003 | Ala-Luukko | ................. | 370/328 |
| 2004/0088405 A1* | 5/2004 | Aggarwal | .................... | 709/224 |
| 2004/0120296 A1* | 6/2004 | Lee et al. | ..................... | 370/338 |
| 2005/0073982 A1* | 4/2005 | Corneille et al. | ............ | 370/338 |
| 2005/0083899 A1* | 4/2005 | Babbar et al. | ................ | 370/342 |
| 2005/0135389 A1* | 6/2005 | Hurtta | ........................ | 370/401 |
| 2005/0281233 A1* | 12/2005 | Parker | ........................ | 370/338 |
| 2006/0133319 A1* | 6/2006 | Kant | ........................... | 370/331 |

FOREIGN PATENT DOCUMENTS

JP            167696           6/2005

OTHER PUBLICATIONS

"Cisco Access Point Name Manager R3.0", *Cisco Systems, Inc.*, 1992-2002, 1-7.
"Siemens Access Pointe Name Manager", *Siemens AG*, 2005, 4 pages.

* cited by examiner

*Primary Examiner*—Vincent P. Harper
*Assistant Examiner*—Simon A Goetze
(74) *Attorney, Agent, or Firm*—Woodcock Washburn LLP (57) ABSTRACT

Systems, methods, and computer readable media are provided for automating the process of provisioning and maintaining Access Point Names ("APNs") for use in digital networks, such as GPRS networks. A plurality of network elements including but not limited to GGSN tables, router tables, firewall systems, VPN tunnels, and Home Location Registry ("HLR") tables can be provisioned and maintained via a centralized system. The invention integrates centralized logging of provisioning, maintenance, and access events, as well as acknowledgement from provisioned network elements, for enhanced security, reporting, and troubleshooting. The invention thus ensures accuracy and reduces operational costs of integrating mobile communications systems with digital networks.

37 Claims, 6 Drawing Sheets

AUTOMATED PROVISIONING, MAINTENANCE, AND INFORMATION LOGGING OF CUSTOM ACCESS POINT NAMES IN PACKET-BASED MOBILE CELLULAR NETWORKS

BACKGROUND

The number of subscribers of mobile communications services has been growing explosively in the past decade. As the popularity of mobile devices expands, the underlying technology that enables mobile communications has also been evolving. Mobile devices evolved from analog transmissions associated with the first mobile phones to digital transmissions presently used by a large variety of mobile communications devices. The big boom in mobile communications can be traced back to the early 1980's when the prevailing technology was Analog Mobile Phone Service ("AMPS"), also known as first generation ("1G"). As time progressed, mobile communications technology took a leap from analog to digital cellar technology, with the emergence two competing technologies: Time Division Multiple Access ("TDMA") and Code Division Multiple Access ("CDMA"). With digital transmissions, more communications can be accommodated in the same amount of radio frequency spectrum. As a result, digital technologies, such as TDMA and CDMA, lay the groundwork for services beyond simple voice telephone calls, and enable data services, e.g., Internet access, text messaging, picture sharing, and so forth to flourish.

The use of digital networks by mobile commmunications devices involves a wide variety of technologies. Data may be converted to a variety of different formats as it is transmitted to its ultimate destination. For example, the Global System for Mobile Communications ("GSM") is presently a popular standard for mobile communications. GSM differs significantly from its predecessors in that both signalling and speech channels are digital, which means that it is seen as a second generation ("2G") mobile device system. Data communication was built into the GSM standard from early on. GSM is an open standard which is currently developed by the 3rd Generation Partnership Project ("3GPP").

Packet data capabilities were added to the GSM standard in 1997 by means of General Packet Radio Service ("GPRS"). Higher speed data transmission have also been introduced with Enhanced Data rates for GSM Evolution ("EDGE") in the 1999 version of the standard. GPRS is a mobile data service available to users of GSM mobile devices. It is often described as "2.5G", that is, a technology between the second (2G) and third (3G) generations of mobile communications. It provides moderate speed data transfer, by using unused TDMA channels in the GSM network.

GPRS is different from the older Circuit Switched Data ("CSD") connection included in GSM standards releases before 1997. In the older system, a data connection established a circuit, and reserved the full bandwidth of that circuit during the lifetime of the connection. GPRS is packet-switched, which means that multiple users share the same transmission channel, only transmitting when they have data to send. Web browsing, receiving e-mails as they arrive, and instant messaging are examples of uses that require intermittent data transfers, which benefit from sharing the available bandwidth.

Regardless of the transmission protocols that are used by a particular mobile device, modern transmissions, whether voice, data, or otherwise, will likely travel across a digital network for at least some portion of their voyage to a final destination. Modem mobile communications systems allow data from mobile devices to be transmitted across digital networks such as the Internet. However, any data transmitted across a digital network must be properly packaged and formatted, and sent via digital equipment that is appropriately provisioned. The use of digital networks to transmit data generally involves placing the data, e.g., data originating from a mobile device, onto a digital network. The data is then sent across the digital network to its destination, and finally retrieved from the digital network for consumption by the recipient.

For example, consider a transmission made by a mobile phone. A signal is transmitted from the mobile phone to a receiving antenna. The data represented by the signal may be transmitted from the receiving antenna to a centralized location. The data may then be converted to a format that is optimized for transmission across digital networks. It is packaged so that the digital network will deliver it to the correct location. Assuming the various network elements such as routers, firewall systems, VPN tunnels, and so forth are correctly provisioned, the data then makes its way across the digital network to its destination. Finally, the data sent in the original transmission is reassembled in a useful format for consumption by a recipient.

Sending data across digital networks in this fashion requires a number of properly provisioned elements. When placed on a digital network, data is routed to an Access Point Name ("APN"), e.g. "UPS.com" corresponding to a specific destination, such as the servers controlled by the United Parcel Service ("UPS"). In order to successfully travel to its destination, Gateway GPRS Support Node ("GGSN") tables, Fixed End System router tables, firewall systems, VPN tunnels, and any number of other elements as required by the particular digital network need to be properly provisioned.

Too often, one or more of the network elements may be improperly provisioned, especially when provisioning elements for a new customer for the first time. This may cause one or more failed transmissions, a lag in the time it takes to provision a network for communications, and high provisioning costs as personnel work to troubleshoot and resolve the transmission problem. Decentralized maintenance and updates to such network elements may cause additional delay in troubleshooting buggy or failed connections.

Moreover, wide access to the various network elements by personnel of a mobile communications company presents a security risk, in that access to elements may cause valuable data to be misappropriated. Mistaken, malicious or otherwise inappropriate disabling of elements, as well as misappropriation of sensitive information such as information on how to connect to a private company's servers, is a real security threat that should be taken seriously. Furthermore, it is difficult in present, decentralized network provisioning systems to gather and synthesize information from the various network elements, which is increasingly important for security purposes as well as regulatory compliance and automated troubleshooting technologies.

In light of the above described state of the mobile communications industry, a solution is needed that facilitates provisioning and maintenance of access point names and associated data for digital transmissions, and facilitates centralized information storage and access control.

SUMMARY

In consideration of the above-identified needs in the mobile communications industry, the present invention provides systems, methods, and computer readable media for automating the process of provisioning and maintaining APNs for use in digital networks, such as GPRS networks. A plurality of network elements including but not limited to GGSN tables, router tables, firewall systems, VPN tunnels, and Home Location Registry ("HLR") tables can be provisioned and maintained via a centralized system. The invention integrates centralized logging of provisioning, maintenance, and access events, as well as acknowledgement from provisioned network elements, for enhanced security, reporting, and troubleshooting. The invention thus ensures accuracy and reduces operational costs of integrating mobile communications systems with digital networks. Other advantages and features of the invention are described below.

BRIEF DESCRIPTION OF THE DRAWINGS

The systems and methods for automating the provisioning, maintenance, and information logging associated with custom APNs in accordance with the present invention are further described with reference to the accompanying drawings, in which.

DETAILED DESCRIPTION

Certain specific details are set forth in the following description and figures to provide a thorough understanding of various embodiments of the invention. Certain well-known details often associated with networks, computing, and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
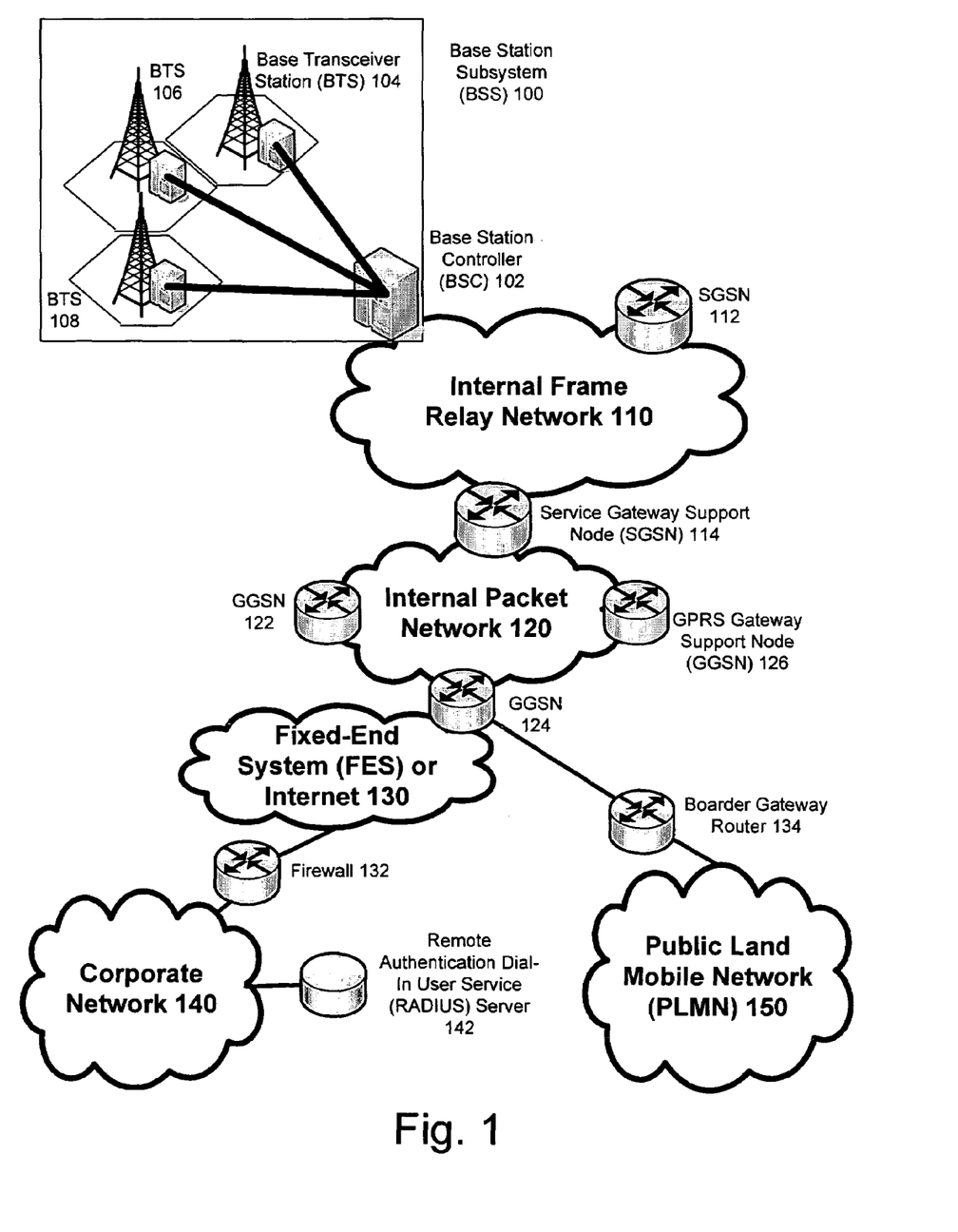
FIG. 1 illustrates an overview of a network environment suitable for service by embodiments of the invention.

FIG. 1 depicts one exemplary environment in which the invention may be practiced. In a packet-based mobile cellular network, such as a GPRS network, there are a plurality of Base Station Subsystem ("BSS") 100, each of which comprises a Base Station Controller ("BSC") 102 serving a plurality of Base Transceiver Stations ("BTS") such as BTSs 104, 106, and 108. Base transceiver stations are the access points where users of packet-based mobile devices get connected with a wireless network. The packet traffic originated from user devices is transported over the air interface to a BTS 108, and from the BTS 108 to the BSC 102. Base station subsystems, such as BSS 100, are a part of internal frame relay network 110 that may include Service GPRS Support Nodes ("SGSN") such as SGSN 112 and 114. Each SGSN is connected to an internal packet network through which a SGSN can route data packets to and from a plurality of gateway GPRS support nodes (GGSN). As illustrated, SGSN 114 and GGSNs 122, 124, and 126 are part of internal packet network 120. Gateway GPRS serving nodes mainly provide an interface to external Internet Protocol ("IP") networks such as Public Land Mobile Network ("PLMN"), corporate intranets, Fixed-End System ("FES") or the public Internet 130. As illustrated, subscriber corporate network 140 is connected to GGSN 124 via firewall 132; and PLMN 150 is connected to GGSN 124 via boarder gateway router 134. The Remote Authentication Dial-In User Service ("RADIUS") server 142 is used for caller authentication when a user of a mobile cellular device calls corporate network 140.

Figure 2:
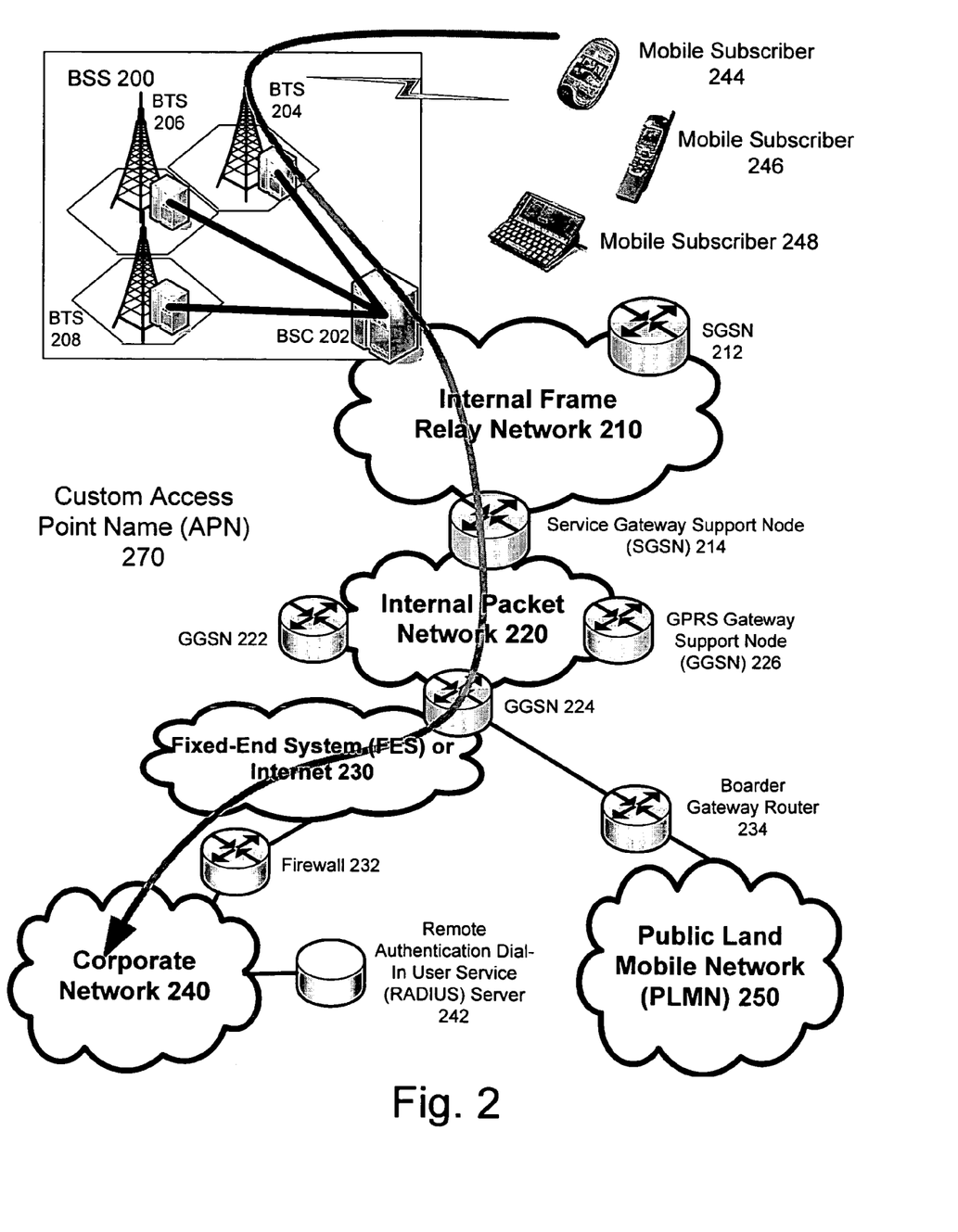
FIG. 2 illustrates the provisioning of a custom APN in a network.

FIG. 2 illustrates an exemplary APN and use thereof as that term is understood herein. In the illustrated embodiment, an APN identifies a Packet Data Network ("PDN") that is accessible from a GGSN node in a GPRS network (e.g., UPS.com). A custom APN may define a dedicated connection between radio access network (shown in FIG. 3), GGSN, and a customer network. In other words, APNs may be names used by a GPRS network to route a specific subscriber through the network to a specific destination. It offers performance predictability and Internet independence in that the path to route a customer's packet data traffic is pre-determined. Other benefits of custom APN include security architecture advantages and dedicated IP addresses for the customers. As shown, when mobile subscribers 244, 246, and 248 make connection with corporate network 240, custom APN 270 is utilized. Here, as an example, the packet data traffic between the end users and corporate network 240 travels through BTS 204, BSC 202, internal frame relay network 210, SGSN 214, internal packet network 220, FES or Internet 230, and firewall 232. For security purposes, before the calls from mobile subscribers 244, 246, and 248 are allowed to go through, the end users' identities are first authenticated by RADIUS server 242.

Figure 3:
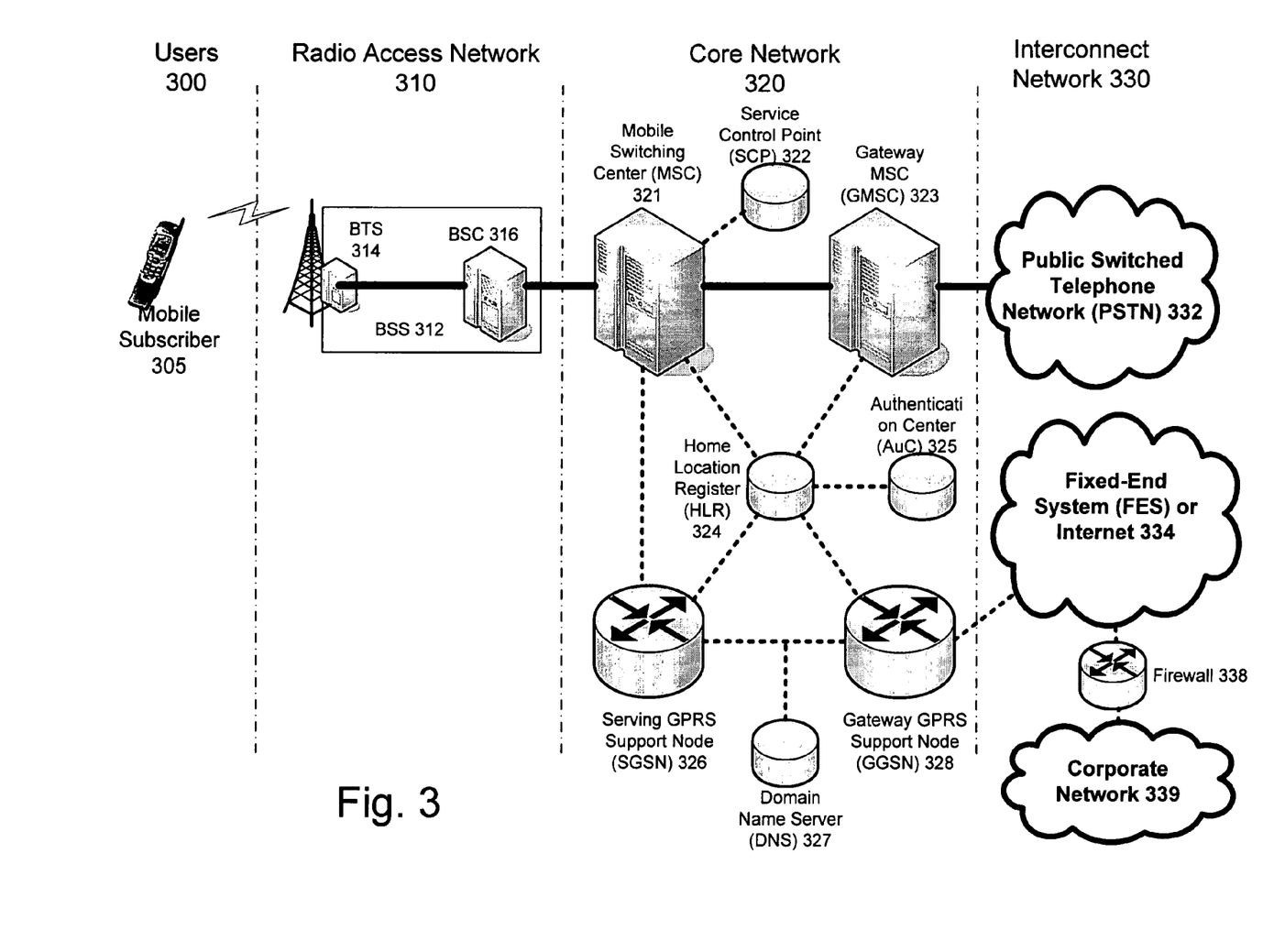
FIG. 3 illustrates a GPRS network architecture that may incorporate various aspects of the invention.

FIG. 3 illustrates a segmental view of the architecture of a typical GPRS network in that the network is segmented into four groups: users, radio access network, core network, and interconnect network. Users 300 comprises a plurality of end users, and here only mobile subscriber 305 is shown. Radio access network 310 comprises a plurality of base station subsystems such as BSS 312, which includes BTS 314 and BSC 316. Core network 320 comprises a host of various network elements, as illustrated here it comprises Mobile Switching Center ("MSC") 321, Service Control Point ("SCP") 322, gateway MSC 323, SGSN 326, Home Location Register ("HLR") 324, Authentication Center ("AuC") 325, Domain Name Server ("DNS") 327, and GGSN 328. Interconnect network 330 comprises a host of various networks and other network elements, as illustrated here it comprises Public Switched Telephone Network ("PSTN") 332, Fixed-End System ("FES") or Internet 334, firewall 338, and Corporate Network 339.

A mobile switching center can be connected to a large number of base station controllers. At MSC 321, depending on the type of traffic, the traffic may be separated in that voice may be sent to Public Switched Telephone Network ("PSTN") 332 through Gateway MSC ("GMSC") 323, and data may be sent to SGSN 326, which then sends the data traffic to GGSN 328 for further forwarding.

When MSC 321 receives call traffic, for example, from BSC 316, it sends a query to a database hosted by SCP 322.

The SCP 322 processes the request and issues a response to MSC 321 so that it may continue call processing as appropriate.

The HLR 324 is the central database for all users to register to the GPRS network. It stores static information about the subscribers such as the International Mobile Subscriber Identity ("IMSI"), subscribed services, and a key for authenticating the subscriber. The HLR 324 also stores dynamic subscriber information such as the current location of the mobile subscriber. Associated with HLR 324 is AuC 325. It is a database that contains the algorithms for authenticating subscribers and the necessary keys for encryption to safeguard the user input for authentication.

When a mobile subscriber turns on his mobile device, the mobile device goes through an attach process by which the mobile device attaches to the SGSN in a GPRS network. In the following description, the term "mobile subscriber" refers to the mobile cellar device used by an end user of the mobile cellar service. In FIG. 3, when mobile subscriber 305 initiates the attach process by turning on the mobile device, an attach request is sent by mobile subscriber 305 to SGSN 326. The SGSN 326 queries another SGSN, where mobile subscriber 305 was attached to before, for the identify of mobile subscriber 305. Upon receiving the identity of mobile subscriber 305 from the other SGSN, SGSN 326 requests more information from mobile subscriber 305. This information is used to authenticate mobile subscriber 305 to SGSN 326 by HLR 324. Once verified, SGSN 326 sends a location update to HLR 324 indicating the change of location to a new SGSN. HLR 324 notifies the old SGSN, where mobile subscriber 305 was attached to before, to cancel the location process for mobile subscriber 305. HLR 324 then notifies SGSN 326 that the location update has been performed. At this time, SGSN 326 sends an Attach Accept message to mobile subscriber 305, which in turn sends an Attach Complete message to SGSN 326.

After attaching itself with the network, mobile subscriber 305 then goes through the authentication process. In the authentication process, SGSN 326 sends the authentication information to HLR 324, which sends information back to SGSN 326 based on the user profile that was part of the user's initial setup. The SGSN 326 then sends a request for authentication and ciphering to mobile subscriber 305. The mobile subscriber 305 uses an algorithm to send the user identification (ID) and password to SGSN 326. The SGSN 326 uses the same algorithm and compares the result. If a match occurs, SGSN 326 authenticates mobile subscriber 305.

Next, the mobile subscriber 305 establishes a user session with the destination network, corporate network 339, by going through a Packet Data Protocol ("PDP") activation process. Briefly, in the process, mobile subscriber 305 requests access to the APN, for example, UPS.com (e.g., which can be corporate network 329 in FIG. 3) and SGSN 326 receives the activation request from mobile subscriber 305. SGSN 326 then initiates a DNS query to learn which GGSN node has access to the UPS.com APN. The DNS query is sent to the DNS server within the core network 320, such as DNS 327, which is provisioned to map to one or more GGSN nodes in the core network 320. Based on the APN, the mapped GGSN 328 can access the requested corporate network 329. The SGSN 326 then sends to GGSN 328 a Create PDP Context Request message that contains necessary information. The GGSN 328 sends a Create PDP Context Response message to SGSN 326, which then sends an Activate PDP Context Accept message to mobile subscriber 305.

Once activated, data packets of the call made by mobile subscriber 305 can then go through radio access network 310, core network 420, and interconnect network 430, in particular fixed-end system or Internet 334 and firewall 338, to reach corporate network 439.

Thus, as explained in the background section, network elements that may need to be provisioned may include but are not limited to Gateway GPRS Support Node ("GGSN") tables, Fixed End System router tables, firewall systems, VPN tunnels, and any number of other network elements as required by the particular digital network need to be properly provisioned.

Figure 4:
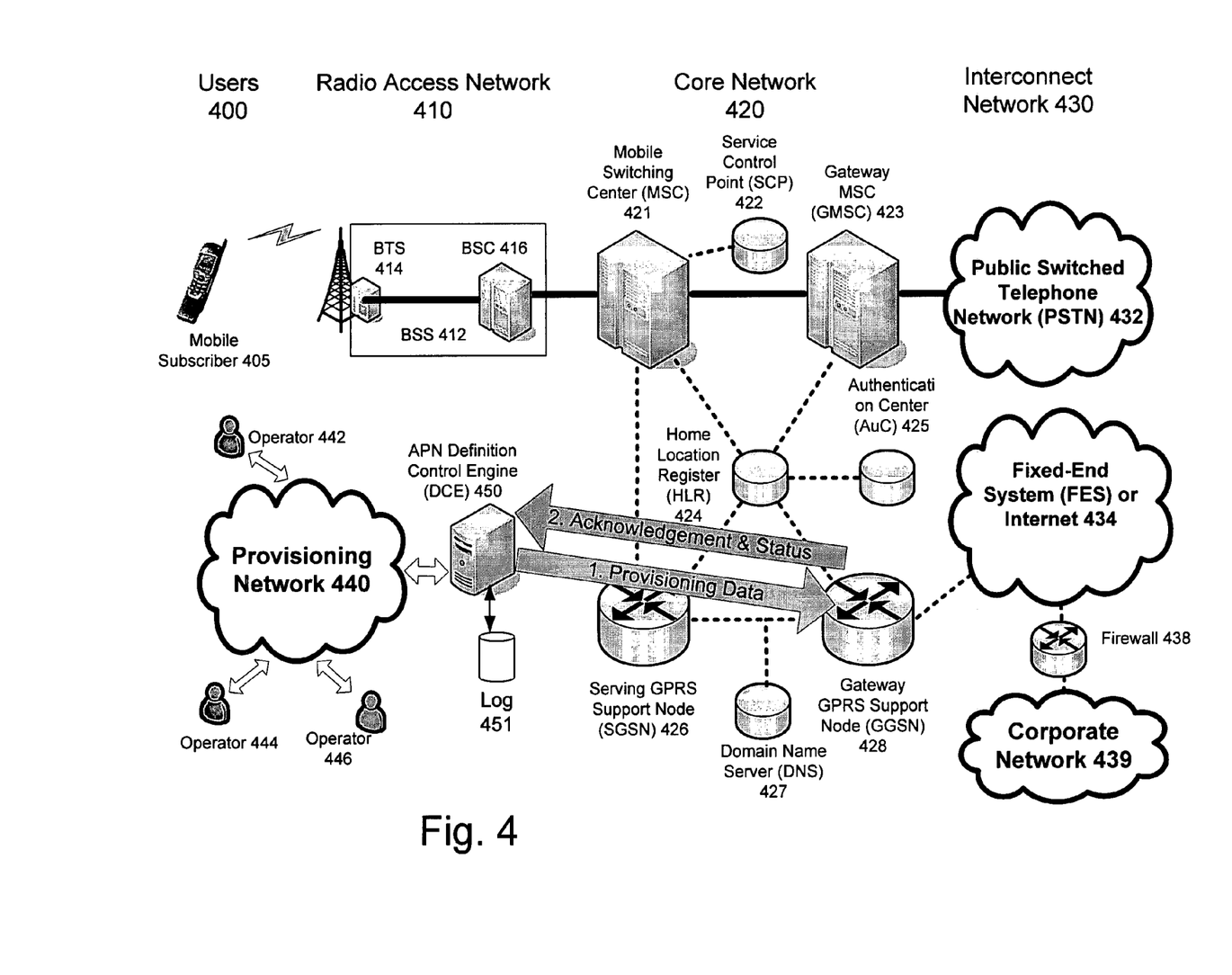
FIG. 4 illustrates an exemplary system and process for automating the provisioning, maintenance, and information logging of custom APNs in a GPRS network.

FIG. 4 depicts an exemplary system and method for automating the provisioning, maintenance, and information storage of custom APNs. In the illustrated embodiment, any of a plurality of a mobile service provider's authorized operators, such as operator 442, 444, and 446, can provision a number network elements, e.g. GGSN 428, DNS 427, SGSN 426, HLR 424, and so forth through provisioning network 440 and APN definition control engine (DCE) 450. DCE 450 is an apparatus, for example, a network-connected computer server, where software for automatically provisioning the various network elements may execute. Software execution at DCE 450 can optionally support any of a plurality of operating systems, such as LINUX, SUN SOLARIS®, and WINDOWS®, depending on the user's preference. Since one of the functions of DCE 450 is to provision network elements to provision custom APNs, DCE 450 may be implemented such that it is capable of communicating directly or indirectly with the various network elements e.g. 428, 427, 424, that can be provisioned in regards to APN generation in the mobile service provider's network.

Depending on the level of authorization, each authorized operator 442, 444, 446, can provision some or all network elements. For example, operator 442 may be a customer service representative and is only authorized to provision GGSN 428, whereas operator 444 may be a systems engineer and is thus authorized to provision GGSN 428, DNS 427, HLR 424, and other network elements. Provisioning network 440 is shown to illustrate that operators do not need direct access to DCE 450, although they can, to perform provisioning. Rather, in one embodiment of the invention, operators can access DCE 450 through the mobile service provider's intranet; and in such case, the mobile service provider's intranet can be viewed as provisioning network 440. Operators can interface with DCE 450 via user interface such as a web browser. To access DCE 450 in such embodiments, an operator only needs to direct a browser on his computing device to the network address of DCE 450. Once connected to DCE 450, the operator may be prompted to enter his user name and password as a security means to prevent unauthorized access or to determine an appropriate level of authorized access.

The invention provides a Graphical User Interface ("GUI") for an operator to enter provisioning information associated with a custom APN. Upon receipt of provisioning information submitted by an operator, DCE 450 stores the information in a centralized log 451 that can be included in the same physical device that hosts DCE 450 or in a database in a physically separate device, such as a database server. The logging of various events carried out by or through DCE 450 is illustrated in connection with FIG. 6. With the provisioning information input and upon a command from an operator, DCE 450 communicates to each of the provisioned network elements, e.g., 428, 427, 424, and implements the relevant parameters in those network elements.

Whenever an operator logs in DCE 450, every operation performed by the operator can be logged in a centralized log 451. In addition to operator-initiated operations, every operation carried out by DCE 450 may also be logged in the same centralized log 451, such as communication with a network element, e.g., 428, 427, 424, and implementation of provisioned parameters. Moreover, upon implementation of the provisioned parameters, each provisioned network element may send an acknowledgement and status of provisioned parameters back to DCE 450 to be logged in the centralized log 451. Each logged entry may be accompanied with the date and time the entry is made, so that a review of the log 451 would reveal the date and time a certain operation or event occurred. For example, during troubleshoot, an operator 442 can look at the centralized log 451 and see the time and sequence of events that took place in determining what might have gone wrong.

Figure 5:
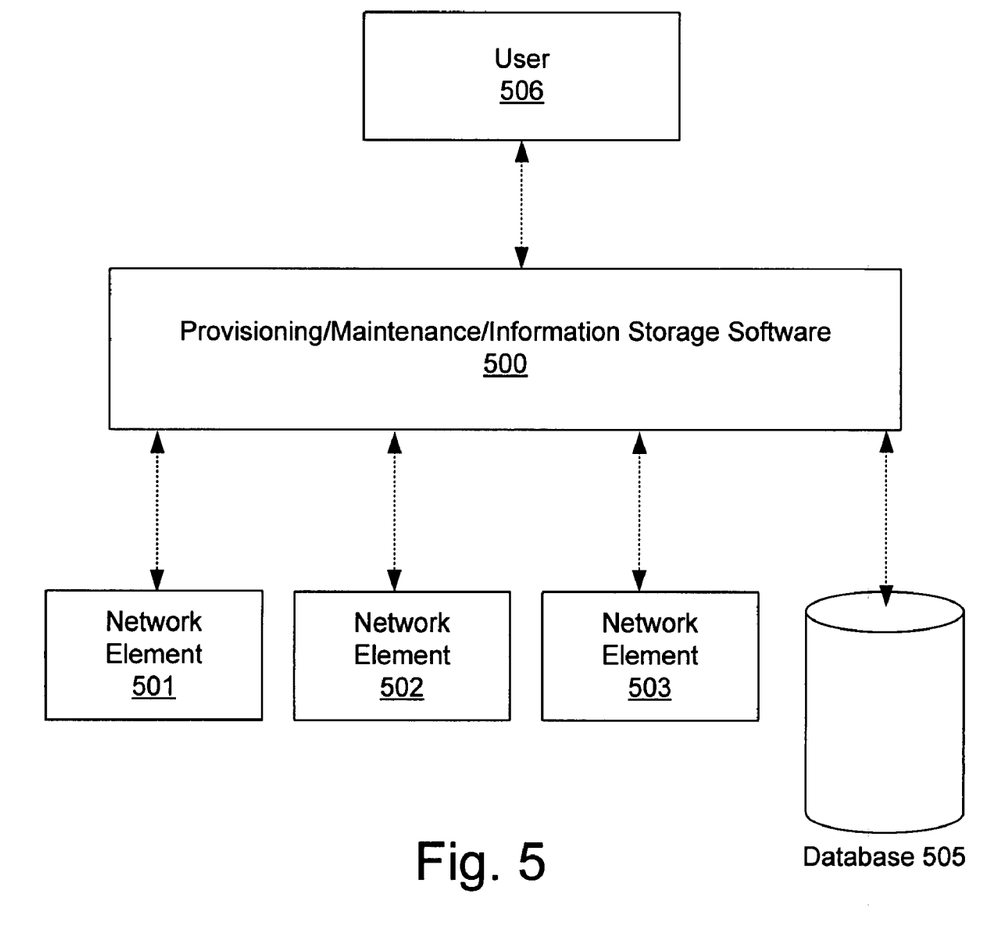
FIG. 5 provides a schematic diagram of a user 506 that can associate a plurality of parameters with an APN using software 500 which executes on a computer. Software 500 can then provision a plurality of network elements 501-503 using the parameters. Information such as the user's identity can be stored in database log 505.

FIG. 5 provides a schematic diagram of a user 506 that can associate a plurality of parameters with an APN using software 500 which executes on a computer. Software 500 can then provision a plurality of network elements 501-503 using the parameters. Information such as the user's identity can be stored in database 505.

Software 500 can execute on a single computer as illustrated by element 450 in FIG. 4, or in a distributed arrangement as will be appreciated by those of skill in the art. In one embodiment, software 500 is accessible by any number of operators, such as user 506, for example through an intranet or internet portal. Such embodiments can leverage any available technology for remotely accessing software 500 functions.

Software 500 may also allow only restricted access to various functions provided by software 500. Restricting access decreases the opportunity for mistaken or malicious reprovisioning or misprovisioning of network elements 501-503. Restricting access also decreases opportunities to misappropriate any sensitive data that may be accessible via software 500. In one restricted access configuration, user 506 may only access the particular functions associated with a single network element, e.g. 501, while other users (not illustrated) may only access the various other network elements 502, 503. Alternatively, a single user 506 may access a plurality, up to and including every network element 501-503. Such embodiments are an advantage of the invention in that network element access may be tailored to the particular needs of a given organization.

Software 500 may provide a number of different feature combinations. Provisioning functionality allows software 500 to automatically update network elements 501-503 with parameters entered by user. User interface functions may allow access to the various controls and functions provided by software 500, and may include remote accessibility features as mentioned above. Thus, the combination of user interface and provisioning functions allows users to manually update parameters of network elements 501-503, and subsequently provision network elements 501-503 with the parameters entered by user 506. For example, if a user 506 enters a new parameter for a router table, to route digital data to a new customer server, software 500 may comprise the necessary functionality to access a network element, e.g. 501, and update the element with the new parameter. Where multiple network elements 501-503 are involved, software 500 may comprise drivers, scripts, and the like to update all of the various elements, which may involve supplying software 500 with a variety of drivers, scripts and the like to communicate with elements from a variety of vendors. Furthermore, software 500 may comprise enabling technologies for any number of communications protocols and so forth.

Maintenance functions provided by software 500 may be an extension of the provisioning technologies. In this regard, previously provisioned elements 501-503 may be reprovisioned, using some variation of the same functions used to originally provision the elements 501-503. Maintenance functions may also include functions for automatically updating parameters for a number of elements, for example when some ubiquitously used parameter is altered.

Software 500 may be extendable in that in some embodiments, new functionality may be added to support new network elements. Some embodiments of the invention may in fact rely on makers of elements 501-503 to provide plug-ins for software 500 which allow provisioning, maintenance, and so forth in the spirit of the invention.

Information storage functions may also be included in software 500. Information storage may log information to database 505 or other data storage repository. A variety of useful data may be logged automatically by software 500 to provide enhanced security, troubleshooting, and regulatory compliance features. A first type of information that is beneficial to log is access data. Such data demonstrates what user, e.g. 506, accessed software 500 and when the access was made. Another type of information that is very useful is a log of provisioning events. Each time a network element, e.g. 501 is provisioned, software may record the element, the parameter(s) that were updated, the time of update, customer(s) associated with the update, the user who initiated the update, and so forth. Various functions may be added to software 500 that allow query-based information retrieval of the information in the log, and may further provide useful queries for troubleshooting particular problems. For example, if it is desired to know the average time between updates for a particular customer, software 500 may provide automated retrieval of such information via a user interface, allowing sophisticated analysis of customer support issues.

Another type of information that may be logged is implementation status of various network elements 501-503. This may comprise a variety of information, including whether an element has experienced any errors, and information about the state and settings of the element. For example, if an element goes offline, this may be discovered by software 500 and logged. If an element is updated locally, for example via some mechanism not associated with software 500, this may be logged.

Regulatory compliance is also a benefit of keeping a log. Corporate reporting has experienced increased scrutiny and is considered an essential part of operations. Data from log 505 may be mined for information relevant to reporting and levels of service provided to customers.

Figure 6:
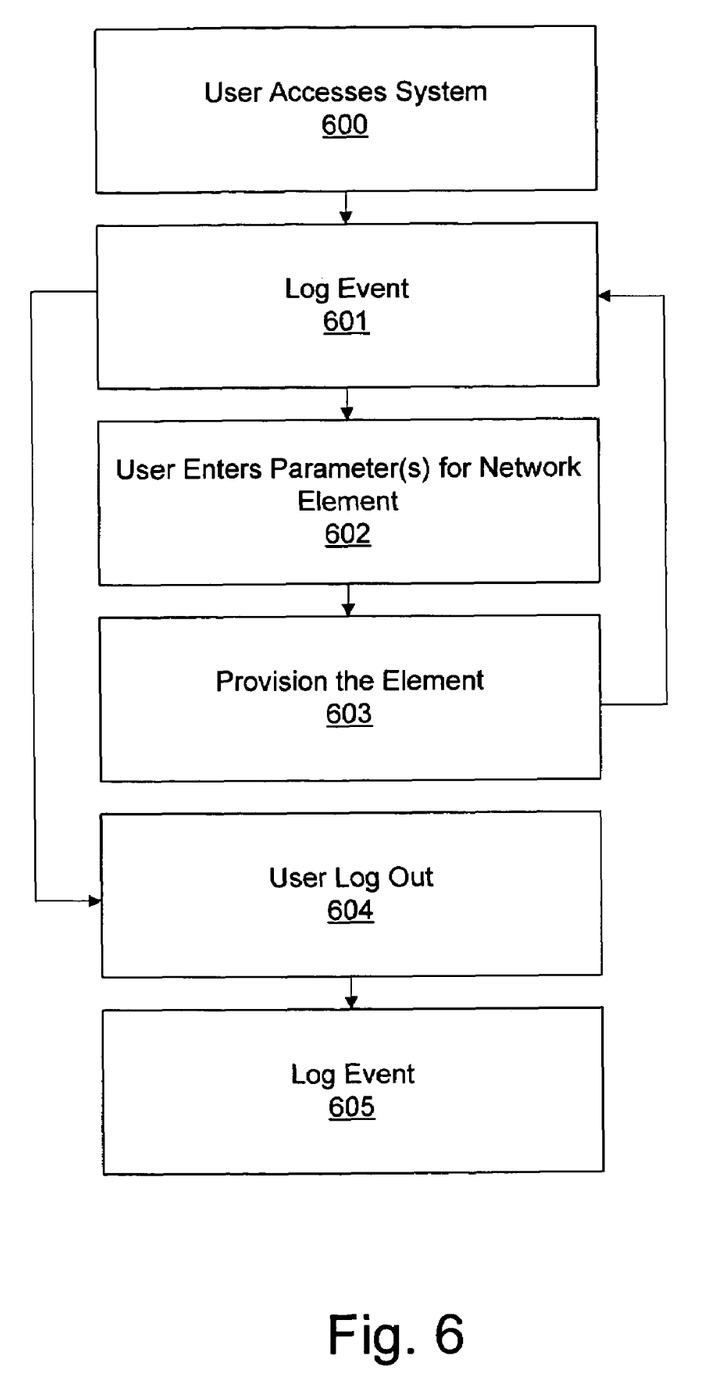
FIG. 6 provides an exemplary sequence of steps for logging information in a log such as 451 from FIG. 4 or 505 from FIG. 5.

FIG. 6 provides an exemplary sequence of steps for logging information in a log such as 451 from FIG. 4 or 505 from FIG. 5. FIG. 6 also demonstrates a generalized view of exemplary operations of software 500 from FIG. 5. As illustrated, the sequence of steps may initiate when a user accesses the system 600. For example, a user may log into an intranet which allows the user web-based access to software 500 from FIG. 5, DCE 450 from FIG. 4, and the like. An exemplary first operation to be carried out is to log the user access event 601.

Next, the hypothetical user may begin providing one or more parameters for one or more network elements 602. For example, a user interface may allow a user to click a network element icon corresponding to the element he wishes the software to provision. The user interface may then display an updateable list of parameters for the selected network element. The user may provide new parameters or update parameters for the element.

When done providing new parameters, the user may indicate by selecting a "done" button or the like to indicate that he wishes to provision the element accordingly. The element to be provisioned can be contacted and updated in step 603. In general, this may comprise establishing a network connection to the element or determining an existing open connection to the element. It may also comprise running a script for updating the element. Of the various network elements in use today, most can be provisioned to run a script in order to update parameters. For elements that are not presently provisionable to accomplish such a task, it may be required to replace them with new elements or otherwise determine techniques for provisioning the element that can be remotely initiated and carried out.

Note the loop in FIG. 6 from step 603 to step 601. As part of provisioning the element 603, operations may be logged 601. Elements may be provisioned and corresponding information logged as long as user continues to supply new parameters in 602. If the user declines to enter new parameters, and instead logs out 604, the logout event can be logged 605 and the process is ended.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Exemplary embodiments refer to utilizing, in some situations, one or more stand-alone computer systems. The invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems. Therefore, the present invention should not be limited to any single embodiment, but rather should be construed in breadth and scope in accordance with the appended claims.

What is claimed:

1. An Access Point Name ("APN") definition control engine for enabling transmission of mobile communications data to a location in a digital network identified by an APN, comprising:

means for associating, by an authorized operator employed by a mobile service provider, a plurality of parameters with a plurality of core network elements, wherein said parameters are used by said core network elements to deliver mobile communications data through said APN;

means for provisioning, by a computer at the direction of said authorized operator, the core network elements with said parameters;

means for logging a user identification corresponding to said authorized operator, an operation performed by said authorized operator, an operation performed by said definition control engine, at least one identification of an affected core network element from said plurality of core network elements, an acknowledgement and status of a provisioned parameter returned from said affected core network element, a date of said operation performed by said authorized operator, and a date of said operation performed by said definition control engine.

2. The APN definition control engine recited in claim 1 wherein the plurality of core network elements comprises at least one Gateway GPRS Support Node ("GGSN").

3. The APN definition control engine recited in claim 1, further comprising means for associating, by an authorized operator, at least one parameter with at least one fixed end system router.

4. The APN definition control engine recited in claim 1, further comprising means for associating, by an authorized operator, at least one parameter with at least one firewall system.

5. The APN definition control engine recited in claim 1 further comprising means for associating, by an authorized operator, at least one parameter with at least one Virtual Private Network ("VPN") tunnel.

6. The APN definition control engine recited in claim 1 further comprising means for associating, by an authorized operator, at least one parameter with at least one gateway support router.

7. The APN definition control engine recited in claim 6 wherein one of said plurality of parameters is an APN to be used by said gateway support router.

8. The APN definition control engine recited in claim 1, further comprising means for logging at least one identification of a parameter used to provision said core network element.

9. The APN definition control engine recited in claim 1, further comprising means for receiving said acknowledgement and status of a provisioned parameter.

10. The APN definition control engine recited in claim 1, further comprising means for defining access rights of an authorized operator such that the authorized operator can perform only activities defined for the said authorized operator to prevent inappropriate provisioning of a core network element.

11. The APN definition control engine recited in claim 1 wherein said means for logging a user identification comprises means for using a centralized database log.

12. The APN definition control engine recited in claim 1, further comprising means for updating at least one parameter.

13. A method for enabling transmission of mobile communications data to a location in a digital network identified by an Access Point Name ("APN"), comprising:

associating, by an authorized operator employed by a mobile service provider, a plurality of parameters with a plurality of core network elements, wherein said parameters are used by said core network elements to deliver mobile communications data to said APN;

provisioning, by a computer at the direction of said authorized operator, the core network elements with said parameters;

logging a user identification corresponding to said authorized operator, an operation performed by said authorized operator, an operation performed by said definition control engine, at least one identification of an affected core network element from said plurality of core network elements, an acknowledgement and status of a provisioned parameter returned from said affected core network element, a date of said operation performed by said authorized operator, and a date of said operation performed by said definition control engine.

14. The method as recited in claim 13 wherein the plurality of core network elements comprises at least one Gateway GPRS Support Node ("GGSN").

15. The method as recited in claim 13 further comprising associating, by an authorized operator, at least one parameter with at least one fixed end system router.

16. The method as recited in claim 13 further comprising associating, by an authorized operator, at least one parameter with at least one firewall system.

17. The method as recited in claim 13 further comprising associating, by an authorized operator, at least one parameter with at least one Virtual Private Network ("VPN") tunnel.

18. The method as recited in claim 13 wherein the plurality of core network elements comprises at least one Home Location Registry ("HLR").

19. The method as recited in claim 13 further comprising associating, by an authorized operator, at least one parameter with at least one gateway support router.

20. The method as recited in claim 19 wherein one of said plurality of parameters is an APN to be used by said gateway support router.

21. The method as recited in claim 13, further comprising logging at least one identification of a parameter used to provision said core network element.

22. The method as recited in claim 13, further comprising receiving said acknowledgement and status of a provisioned parameter.

23. The method as recited in claim 13, further comprising defining access rights of an authorized operator such that the authorized operator can perform only activities defined for the said authorized operator to prevent inappropriate provisioning of a core network element.

24. The method as recited in claim 13 wherein said logging a user identification is conducted using a centralized database log.

25. The method as recited in claim 13, further comprising updating at least one parameter.

26. A computer readable medium bearing instructions for enabling transmission of mobile communications data to a location in a digital network identified by an Access Point Name ("APN"), comprising:

instructions for associating, by an authorized operator employed by a mobile service provider, a plurality of parameters with a plurality of core network elements, wherein said parameters are used by said core network elements to deliver mobile communications data to said APN;

instructions for provisioning, by a computer at the direction of said authorized operator, the core network elements with said parameters;

instructions for logging a user identification corresponding to said authorized operator, an operation performed by said authorized operator, an operation performed by said definition control engine, at least one identification of an affected core network element from said plurality of core network elements, an acknowledgement and status of a provisioned parameter returned from said affected core network element, a date of said operation performed by said authorized operator, and a date of said operation performed by said definition control engine.

27. The computer readable medium as recited in claim 26 wherein the plurality of core network elements comprises at least one Gateway GPRS Support Node ("GGSN").

28. The computer readable medium as recited in claim 26 further comprising instructions for associating, by an authorized operator, at least one parameter with at least one fixed end system router.

29. The computer readable medium as recited in claim 26 further comprising instructions for associating, by an authorized operator, at least one parameter with at least one firewall system.

30. The computer readable medium as recited in claim 26 further comprising instructions for associating, by an authorized operator, at least one parameter with at least one Virtual Private Network ("VPN") tunnel.

31. The computer readable medium as recited in claim 26 further comprising instructions for associating, by an authorized operator, at least one parameter with at least one gateway support router.

32. The computer readable medium as recited in claim 31 wherein one of said plurality of parameters is an APN to be used by said gateway support router.

33. The computer readable medium as recited in claim 26, further comprising instructions for logging at least one identification of a parameter used to provision said core network element.

34. The computer readable medium as recited in claim 26, further comprising instructions for receiving said acknowledgement and status of a provisioned parameter.

35. The computer readable medium as recited in claim 26, further comprising instructions for defining access rights of an authorized operator such that the authorized operator can perform only activities defined for the said authorized operator to prevent inappropriate provisioning of a core network element.

36. The computer readable medium as recited in claim 26 wherein said instructions for logging a user identification comprise instructions for logging in a centralized database log.

37. The computer readable medium as recited in claim 26, further comprising instructions for updating at least one parameter.

* * * * *